G. F. SCHRIBER.
METAL SHEATHED PNEUMATIC TIRE FOR VEHICLES.
APPLICATION FILED JUNE 2, 1921.
1,422,791.
Patented July 11, 1922.
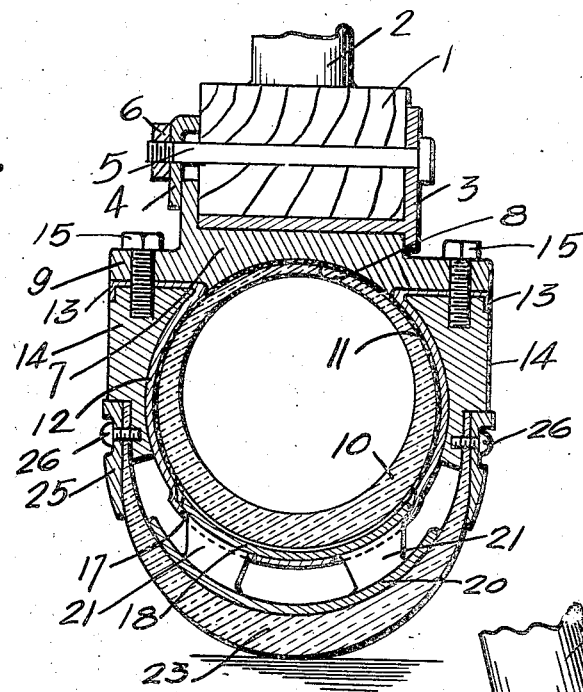
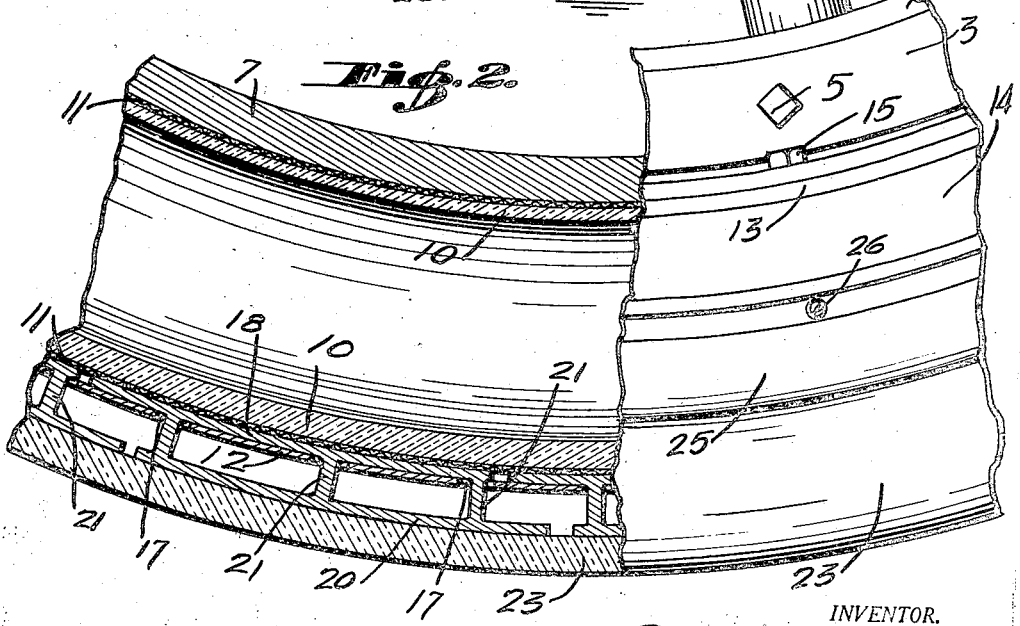
INVENTOR.
George F. Schriber
BY
Hazard & Miller
ATTORNEYS

UNITED STATES PATENT OFFICE.

GEORGE F. SCHRIBER, OF LONG BEACH, CALIFORNIA.

METAL-SHEATHED PNEUMATIC TIRE FOR VEHICLES.

1,422,791.  Specification of Letters Patent.  Patented July 11, 1922.

Application filed June 2, 1921. Serial No. 474,385.

*To all whom it may concern:*

Be it known that I, GEORGE F. SCHRIBER, a citizen of the United States, residing at Long Beach, in the county of Los Angeles and the State of California, have invented new and useful Improvements in Metal-Sheathed Pneumatic Tires for Vehicles, of which the following is a specification.

It is the object of this invention to provide a pneumatic tire which is puncture proof and not liable to blow outs.

More specifically it is the object of the invention to provide a tire including an inner tube, a metallic sheathing for the same, and a tread member, the parts being so arranged as to obtain the usual resiliency of a pneumatic tire, while at the same time affording protection for the inner tube against any damage.

The improved construction also affords a light and inexpensive device, but one which has the necessary strength, and at the same time provides a readily attachable and detachable tire in which the tread portion is also readily attached and detached so that the tread may be readily renewed.

The invention will be readily understood from the following description of the accompanying drawings in which:

Figure 1 is a transverse section through a tire constructed in accordance with the invention and mounted upon the rim of a wheel.

Fig. 2 is a side elevation showing a portion of the tire and wheel, and partly broken away to show the tire in section.

The tire may be mounted upon a usual wheel including rim 1 and spoke 2. The rim is provided with usual attaching means 3 and 4 for a demountable rim, such as is employed in connection with a usual tire, and said attaching means are connected in usual manner by bolts 5 receiving nuts 6.

Instead of the usual demountable rim for a tire, the improved construction employs a rim block 7 which may be of pressed metal and which is adapted to be demountably engaged by the attaching means 3—4. This rim block is grooved as shown at 8 in order to receive an inner tube, and the sides of the rim block extend outwardly as shown at 9 beyond the side of the inner tube. A usual inner tube 10 is received against the rim block preferably with a fabric liner 11 surrounding the inner tube.

A metallic sheathing 12 is received around the inner tube and against liner 11, and the sides of this sheathing are bent so as to form lips 13 received against the side extentions 9 of the rim block.

Annular side plates 14 which form reinforcing means are received against the sides of sheathing 12 and also against the lips 13 of the sheathing so as to maintain the latter in position. Connecting bolts 15 are received through the extensions 9 of the rim block, through the lips 13 of the sheathing, and into the side plates 14.

The tread portion of sheathing 12 is formed with openings 17, and said tread portion of the sheathing is radially outwardly disposed with relation to the inner tube so that inner circumferential sectional protecting plates 18 may be received between the liner for the inner tube and the tread portion of sheathing 12. These protecting plates overlie the openings 17.

A tread member is provided for the tire including circumferential sectional tread plates 20 which have lugs 21 extending radially inwardly therefrom and adapted to project through openings 17 and impinge against the plates 18. By this arrangement it will be seen that movement imparted to sections 20 of the tread member will be transmitted by way of lugs 21 and plates 18 to the inner tube in order that the full resilient qualities of a usual pneumatic tire may be obtained.

A detachable tread surface is mounted upon tread sections 20 and preferably comprises a resilient annulus 23 of rubber or the like. This tread surface is readily renewable, and for this purpose may be detachably mounted upon the tire as by extending the sides of the same so as to overlie the sides of plates 14 with rings 25 received against said side edges of the tread block 23 in order to secure the same in position. Screws 26 received through rings 25 and the side edges of the tread block are threaded into side plates 14 for detachably connecting the parts.

It will be noted that the construction as thus set forth provides an adequate sheathing for the inner tube in order to prevent puncturing of the inner tube. At the same time the tire will have the usual resilient qualities, since the sectional tread members 20 will readily yield, and the movement of the lugs 21 of said tread members will be cushioned by the inner tube which supports the sectional plates 18 having the lugs 21 abutting against the same. It will be also noted that the tire construction eliminates the possibility of blow outs and the like.

Various changes may be made without departing from the spirit of the invention as claimed.

What is claimed is:

A pneumatic tire comprising a rim block adapted to be mounted upon a wheel and having an annular groove in its peripheral face to form a seat for an inner tube, the sides of the rim block extending outwardly from the annular groove, an inner tube covered with a liner and fitting in the annular groove, a metallic sheathing around the inner tube against the liner and extending outwardly and fitting the peripheral faces of the rim block at the sides of the groove, said metallic sheathing having peripheral openings at its tread portion, said sheathing being offset outwardly around the openings, circumferential sectional protecting plates fitting against the liner within the sheathing and covering the openings, circumferential sectional tread plates having lugs extending radially inwardly through the openings in the sheathing and impinging against the protecting plates, annular side plates fitting against the sides of the sheathing and bolted to the rim block, and a tire tread fitting against the tread plates and having side edges removably secured to the side plates.

In testimony whereof I have signed my name to this specification.

GEORGE F. SCHRIBER.